United States Patent
Gupta et al.

(10) Patent No.: US 10,572,012 B2
(45) Date of Patent: Feb. 25, 2020

(54) ELECTRONIC DEVICE FOR PERFORMING GESTURES AND METHODS FOR DETERMINING ORIENTATION THEREOF

(71) Applicant: Samsung Electronics Co., Ltd., Gyeonggi-do (KR)

(72) Inventors: Gaurav Gupta, Gurgaon (IN); Sonu Agarwal, Ghaziabad (IN)

(73) Assignee: Samsung Electronics Co., Ltd (KR)

( * ) Notice: Subject to any disclaimer, the term of this patent is extended or adjusted under 35 U.S.C. 154(b) by 9 days.

(21) Appl. No.: 15/899,803

(22) Filed: Feb. 20, 2018

(65) Prior Publication Data
US 2018/0239429 A1 Aug. 23, 2018

(30) Foreign Application Priority Data
Feb. 17, 2017 (IN) .............................. 201741005693

(51) Int. Cl.
*G06F 3/01* (2006.01)
*G06F 3/044* (2006.01)
*G06F 3/0354* (2013.01)
*G06F 3/0346* (2013.01)

(52) U.S. Cl.
CPC .............. *G06F 3/014* (2013.01); *G06F 3/011* (2013.01); *G06F 3/017* (2013.01); *G06F 3/0346* (2013.01); *G06F 3/03547* (2013.01); *G06F 3/044* (2013.01); *G06F 2203/0339* (2013.01); *G06F 2203/04101* (2013.01); *G06F 2203/04106* (2013.01)

(58) Field of Classification Search
CPC ...................................................... G06F 3/014

USPC ......................................................... 345/173
See application file for complete search history.

(56) References Cited

U.S. PATENT DOCUMENTS

| | | | |
|---|---|---|---|
| 10,139,906 B1 * | 11/2018 | Bai | ......................... G06F 3/014 |
| 2012/0330594 A1 | 12/2012 | Lee et al. | |
| 2014/0139422 A1 | 5/2014 | Mistry et al. | |
| 2015/0277559 A1 | 10/2015 | Vescovi et al. | |
| 2015/0338916 A1 * | 11/2015 | Priyantha | ................ G06F 3/017 |
| | | | 345/173 |

(Continued)

FOREIGN PATENT DOCUMENTS

| | | |
|---|---|---|
| WO | WO 2015/113503 | 8/2015 |
| WO | WO 2016/003365 | 1/2016 |
| WO | WO 2016/137514 | 9/2016 |

OTHER PUBLICATIONS

International Search Report dated May 18, 2018 issued in counterpart application No. PCT/KR2018/001511, 4 pages.

(Continued)

*Primary Examiner* — Long D Pham
(74) *Attorney, Agent, or Firm* — The Farrell Law Firm, P.C.

(57) ABSTRACT

A method and an electronic device for detecting a gesture performed by a user using a wearable device are provided. The method includes determining a first orientation of the wearable device using at least one inertial sensor; determining an orientation of the wearable device worn on a finger of the user by at least one touch sensor; determining a final orientation of the wearable device using the determined first orientation and the determined orientation of the wearable device; and interpreting at least one user gesture based on the determined first orientation of the wearable device.

17 Claims, 23 Drawing Sheets

(56) References Cited

U.S. PATENT DOCUMENTS

2016/0034742 A1 2/2016 Kim et al.
2016/0098086 A1 4/2016 Li
2016/0292563 A1* 10/2016 Park ................ G06K 19/07762
2017/0351345 A1 12/2017 Nirjon et al.

OTHER PUBLICATIONS

European Search Report dated Oct. 30, 2019 issued in counterpart application No. 18755038.9-1216, 11 pages.

* cited by examiner

Hand Position 1

Hand Position 2

Hand Position 1          Hand Position 2

ELECTRONIC DEVICE FOR PERFORMING GESTURES AND METHODS FOR DETERMINING ORIENTATION THEREOF

PRIORITY

This application claims priority under 35 U.S.C. § 119(a) to an Indian Patent Application filed on Feb. 17, 2017 in the Indian Intellectual Property Office and assigned Serial No. 201741005693, the entire disclosure of which is incorporated herein by reference herein.

BACKGROUND

1. Field of the Disclosure

The present disclosure relates generally to a user interacting with an electronic device, and more particularly, to determining an orientation of an electronic device using at least one touch sensor and at least one inertial sensor.

2. Description of the Related Art

Ring shaped wearable devices have been proposed as processors for electronic devices (such as Internet of Things (IoT) devices, mobile phones, smart phones, computers, wearable computing devices, and so on). Since a ring is symmetric and can move about a finger of a user, determining an orientation of a ring is difficult.

FIGS. 1A, 1B, 1C, 1D, and 1E are illustrations of of a user interacting with an electronic device on the user's finger.

Referring to FIGS. 1A, 1B, 1C, 1D, and 1E, when a user performs a flick gesture about a global x-axis ($x_g$) (as illustrated in FIG. 1A). The gesture would typically be mapped to a vertical scroll. If the inertial sensor in the ring is oriented as shown in FIG. 1B, the rotation about $x_g$ corresponds to rotation about $x_r$ for the ring (e.g., a vertical scroll). If the ring has turned on the finger and the inertial sensor is oriented as shown in FIG. 1C, rotation about $x_g$ corresponds to rotation about $y_r$ for the ring. This may lead to the motion being interpreted as a horizontal scroll.

When a user intends to perform a vertical scroll. A ring measures rotation about its local co-ordinate axis $y_r$ (as illustrated in FIG. 1D). When a user intends to perform a horizontal scroll. A ring measures rotation about its local co-ordinate axis $y_r$ (as illustrated in FIG. 1E). The ring interprets that the user wishes to perform a vertical scroll in both scenarios described above and a device connected to the ring performs a vertical scroll in both scenarios.

SUMMARY

An aspect of the present disclosure provides an electronic device including at least one touch sensor and at least one inertial sensor.

Another aspect of the present disclosure provides methods for determining an absolute orientation of an electronic device and a corresponding finger (on which the electronic device is worn) using at least one touch sensor and at least one inertial sensor.

Another aspect of the present disclosure provides methods and systems for determining motion gestures, upon determining an orientation of an electronic device.

Another aspect of the present disclosure provides methods and systems for determining finger motion tracking, upon determining an orientation of an electronic device.

According to an aspect of the present disclosure, a method for detecting a gesture performed by a user using a wearable device is provided. The method includes determining a first orientation of the wearable device using at least one inertial sensor; determining an orientation of the wearable device worn on a finger of the user by at least one touch sensor; determining a final orientation of the wearable device using the determined first orientation and the determined orientation of the wearable device; and interpreting at least one user gesture based on the determined first orientation of the wearable device.

According to another aspect of the present disclosure, an electronic device is provided. The electronic device includes at least one inertial sensor configured to determine a first orientation of the electronic device at least one touch sensor configured to determine an orientation of the electronic device worn on at least one finger of a user; and a processor configured to determine a final orientation of the electronic device using the determined first orientation and the determined orientation of the electronic device; and interpret at least one user gesture based on the determined first orientation of the electronic device.

BRIEF DESCRIPTION OF DRAWINGS

The above and other aspects, features, and advantages of the present disclosure will be more apparent from the following detailed description, taken in conjunction with the accompanying drawings, in which.

DETAILED DESCRIPTION

Figure 1A:
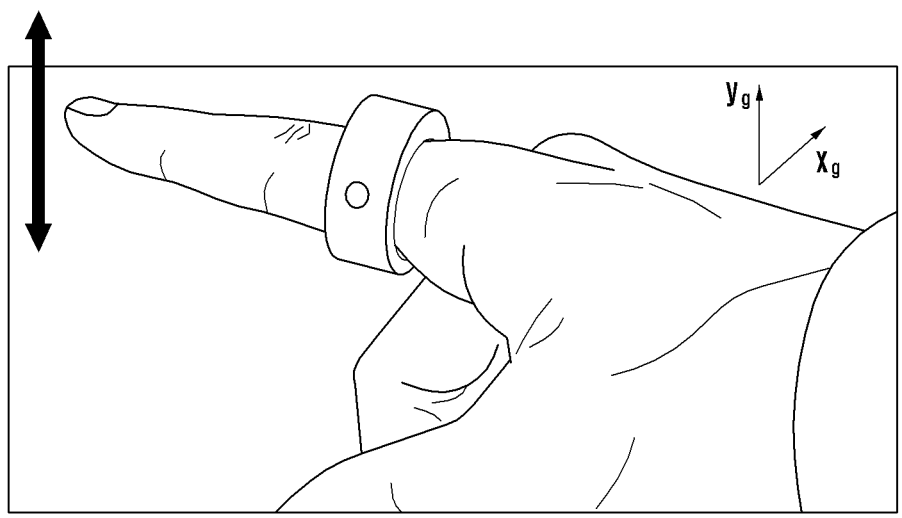
FIGS. 1A, 1B, 1C, 1D, and 1E are illustrations of a user interacting with an electronic device on the user's finger.
Figure 1B:
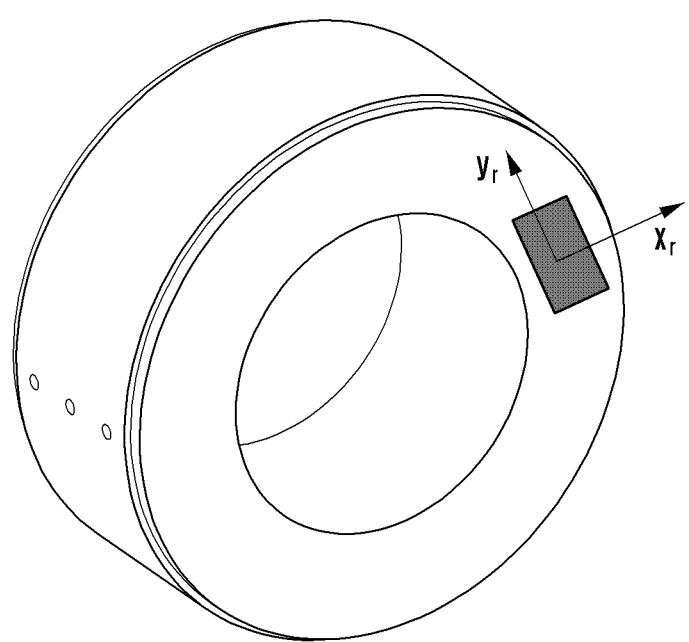
Figure 1C:
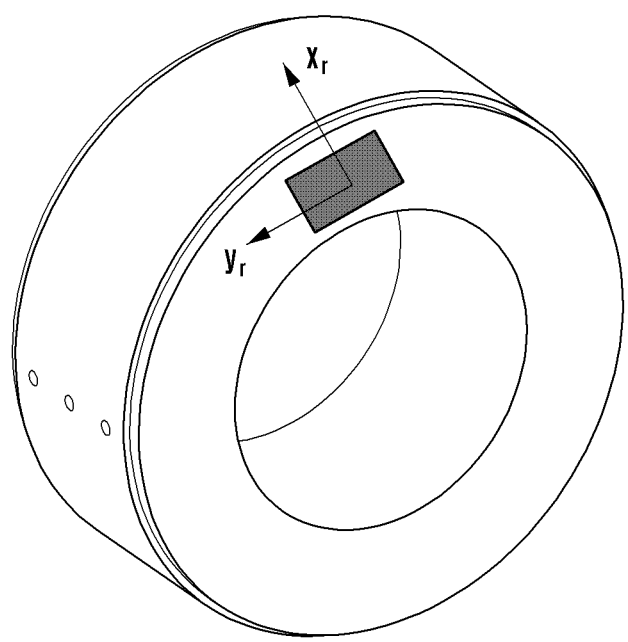
Figure 1D:
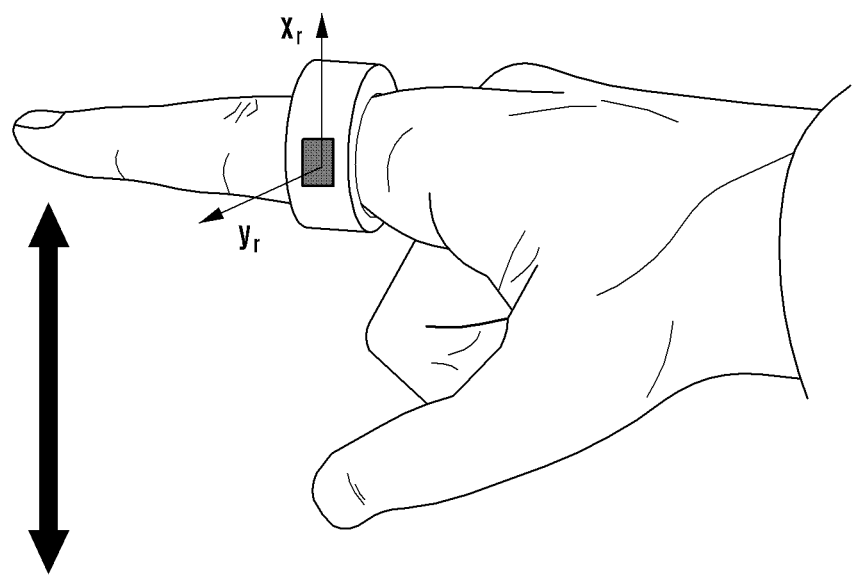
Figure 1E:
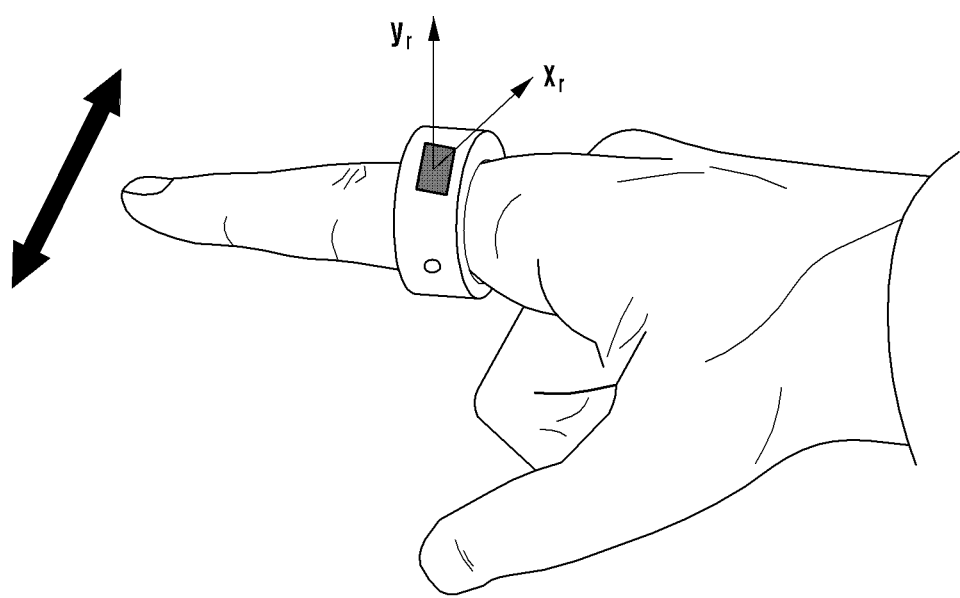

The present disclosure and various features and advantageous details thereof are described below with reference to the accompanying drawings. Descriptions of well-known components and processing techniques are omitted so as to not unnecessarily obscure the present disclosure. The present disclosure is intended to facilitate an understanding of ways in which the present disclosure may be practiced and to further enable those of skill in the art to practice the present disclosure. Accordingly, this disclosure is not intended to limit the scope of the present disclosure.

The present disclosure concerns a wearable device such as an electronic device including at least one touch sensor and at least one inertial sensor, and methods for determining an absolute orientation of the electronic device and a corresponding finger (on which the electronic device is worn) using the at least one touch sensor and the at least one inertial sensor. In the accompanying drawings, similar reference characters denote corresponding features consistently throughout the accompanying drawings.

Figure 2A:
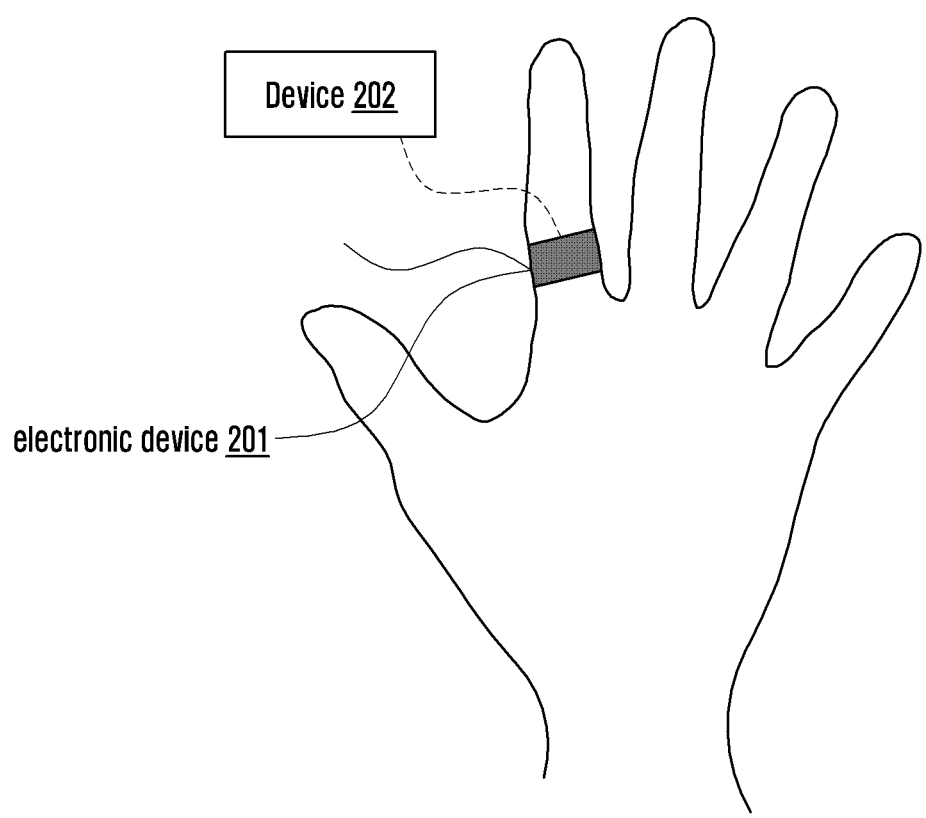
FIGS. 2A and 2B are illustrations of an electronic device worn by a user connected to at least one device, according to an embodiment of the present disclosure.
Figure 2B:
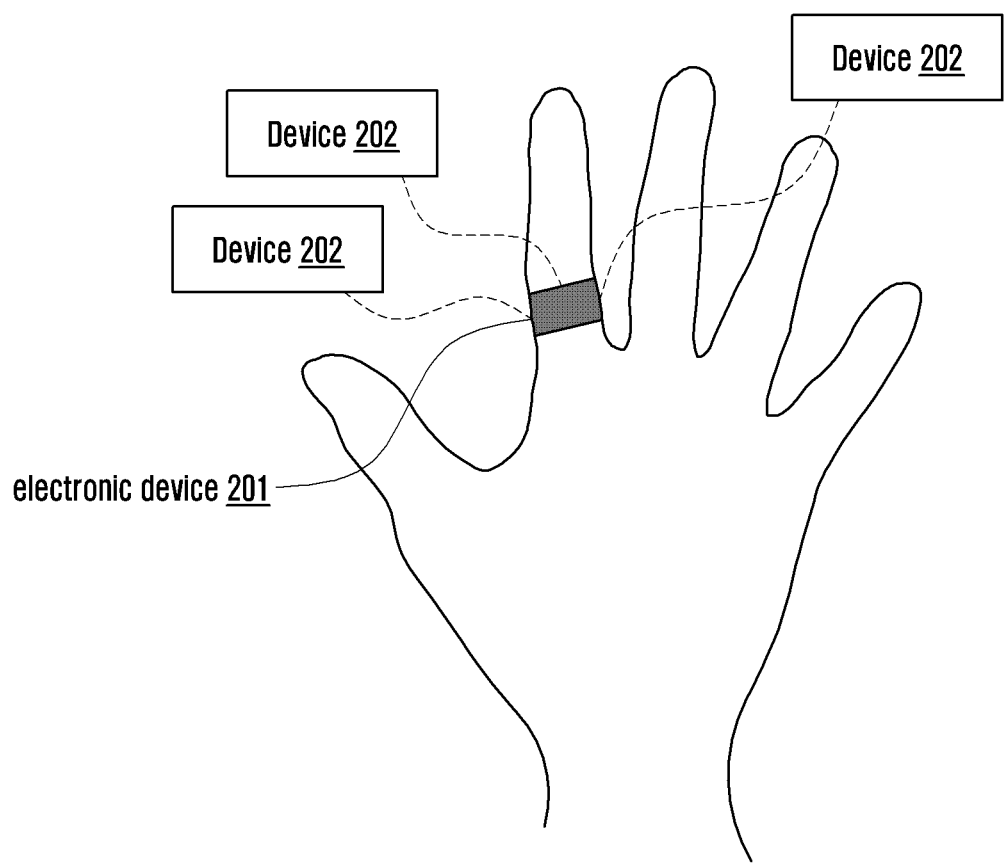

FIGS. 2A and 2B are illustrations of an electronic device 201 worn by a user connected to at least one device. The electronic device 201 is a wearable electronic device that may be worn on a finger of the user. Examples herein depict the user wearing the electronic device 201 on an index finger; however, it may be obvious to a person of ordinary skill in the art to have the user wear the electronic device 201 on any finger. The user may also wear electronic devices on multiple fingers.

Referring to FIGS. 2A and 2B, the electronic device 201 may be connected to at least one device 202. FIG. 2A depicts the electronic device 201 connected to one device 202. FIG. 2B depicts the electronic device 201 connected to a plurality of devices 202. The device 202 may be a device such as but not limited to a television, a smart phone, a tablet computer, a mobile phone, a projector, a VR device, an IoT device, and a wearable computing device. The electronic device 201 may be connected to the device 202 using at least one of a wired means or a wireless means (such as Bluetooth, wireless fidelity (Wi-Fi), near field communication (NFC), infrared (IR), or any other equivalent means). The electronic device 201 enables the user to interact with the device 202.

Figure 3:
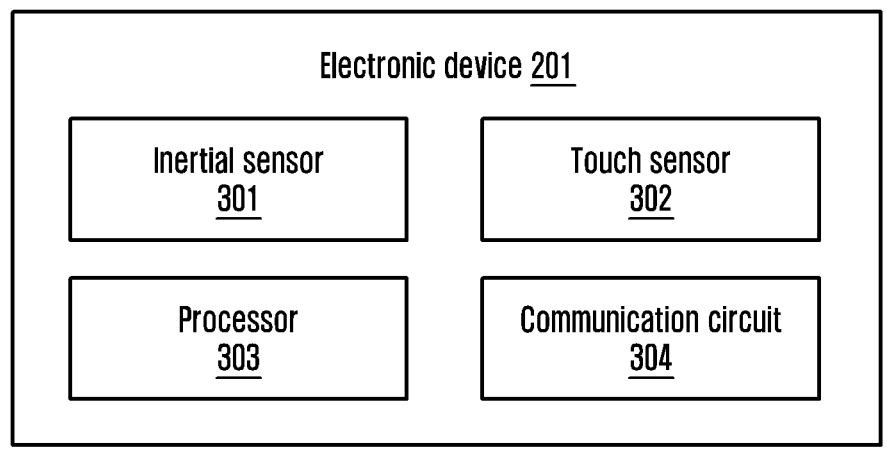
FIG. 3 is a block diagram of an electronic device, according to an embodiment of the present disclosure.

FIG. 3 is a block diagram of the electronic device 201. The electronic device 201, as depicted, includes at least one inertial sensor 301, at least one touch sensor 302, a processor 303, and at least one communication circuit 304.

Referring to FIG. 3, the communication circuit 304 may be used to communicate with at least one external entity such as the device 202. The communication circuit 304 may use at least one of a wired means or a wireless means (such as Bluetooth, Wi-Fi, NFC, IR, or any other equivalent means).

The inertial sensor 301 may detect an orientation of the electronic device 201. In an embodiment of the present disclosure, the inertial sensor 301 may be a multi-axis sensor, such as a 9-axis sensor. The surface of the electronic device 201 may be divided into a pre-determined number of touch locations (as depicted in FIG. 4A), relative to the inertial sensor 301.

Figure 4A:
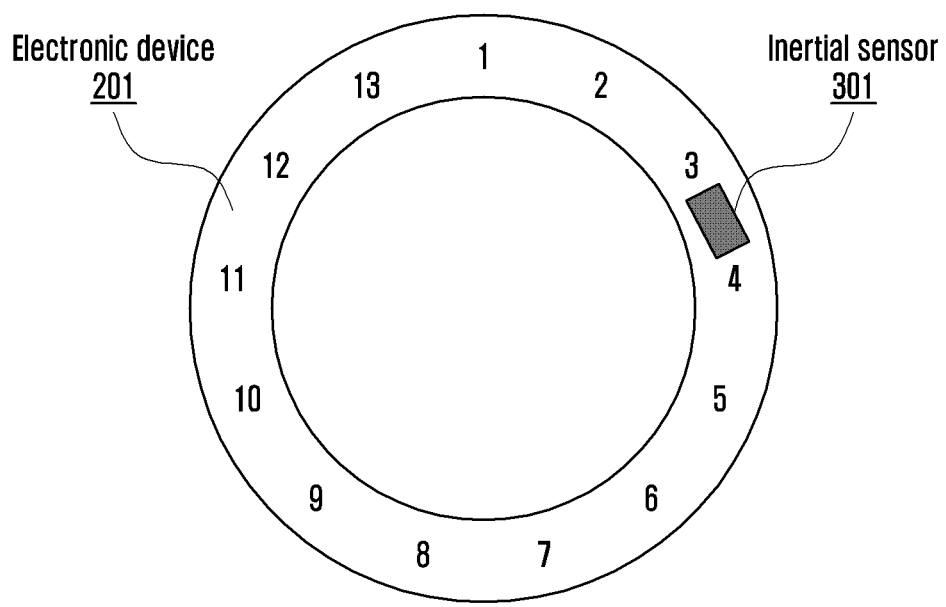
FIG. 4A is an illustration of an electronic device divided into a pre-determined number of touch locations, according to an embodiment of the present disclosure.

FIG. 4A is an illustration of an electronic device divided into a pre-determined number of touch locations, according to an embodiment of the present disclosure.

Figure 4B:
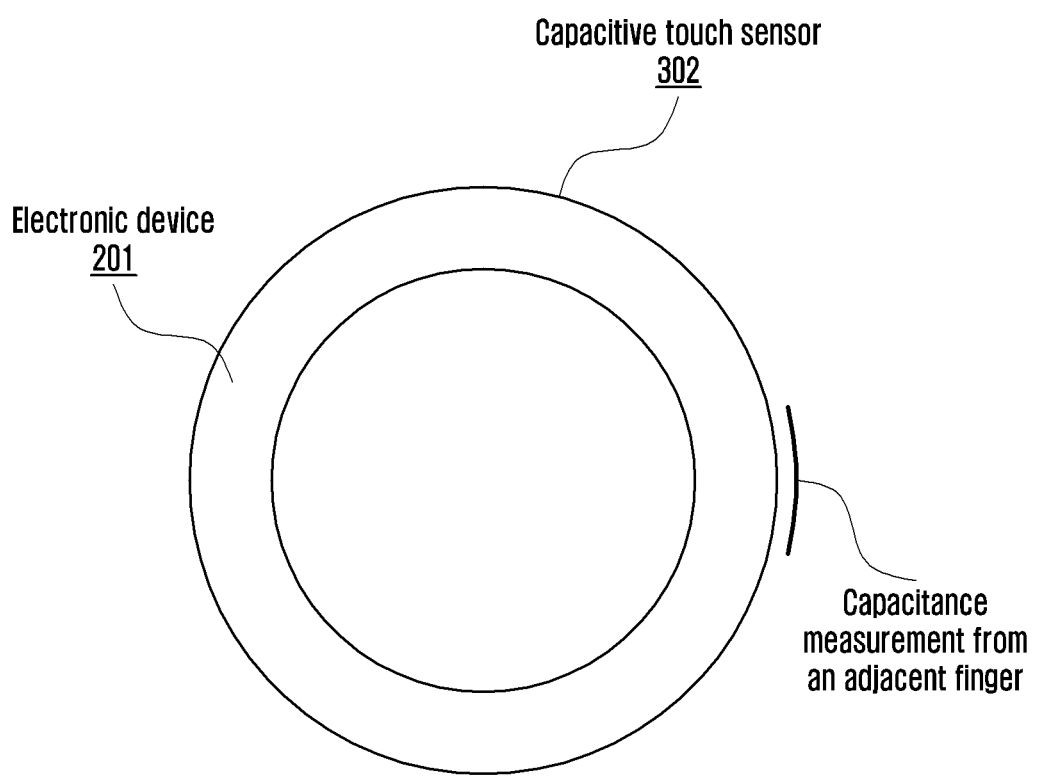
FIG. 4B is an illustration of a touch sensor measuring a capacitance from an adjacent finger, according to an embodiment of the present disclosure.

The touch sensor 302 may detect touch/capacitance along the surface of the electronic device 201. The touch sensor 302 may measure a capacitance from an adjacent finger (as depicted in FIG. 4B). The touch sensor 302 may determine the orientation of the electronic device 201 on the finger based on the capacitance measured because of the adjacent finger(s) and relative location of the inertial sensor 301. In an embodiment of the present disclosure, the touch sensor 302 may be a capacitive touch sensor.

FIG. 4B is an illustration of a touch sensor measuring a capacitance from an adjacent finger, according to an embodiment of the present disclosure.

The processor 303 may receive data measured by the inertial sensor 301 and the touch sensor 302. The data measured by the inertial sensor 301 may include the orientation of the electronic device 201 in global coordinates. The data measured by the touch sensor 302 may include the orientation of the electronic device 201. The processor 303 may determine an absolute orientation of the electronic device 201 by combining the data measured by the inertial sensor 301 and the touch sensor 302.

Based on an action performed by the user (such as pointing a finger (if the electronic device 201 is worn on the finger) or waving a plurality of fingers (if rings are worn on at least one of the fingers being waved), the processor 303 may determine the device 202 that the user desires to control and perform at least one operation corresponding to the action performed by the user (with the assistance of the communication circuit 304).

Figure 4C:
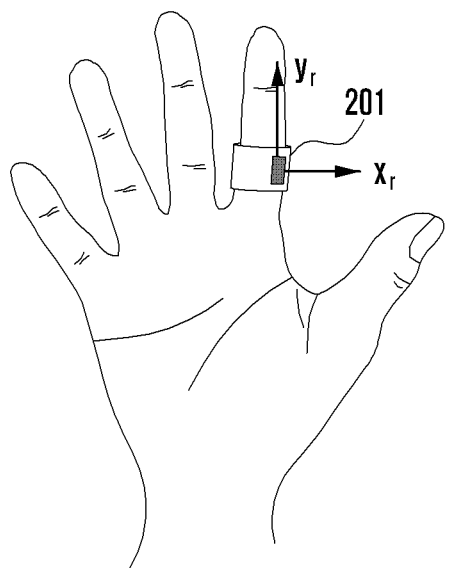
FIG. 4C is an illustration of an electronic device determining a final orientation of the electronic device by using information from touch sensors and inertial sensors, according to an embodiment of the present disclosure.
Figure 4C:
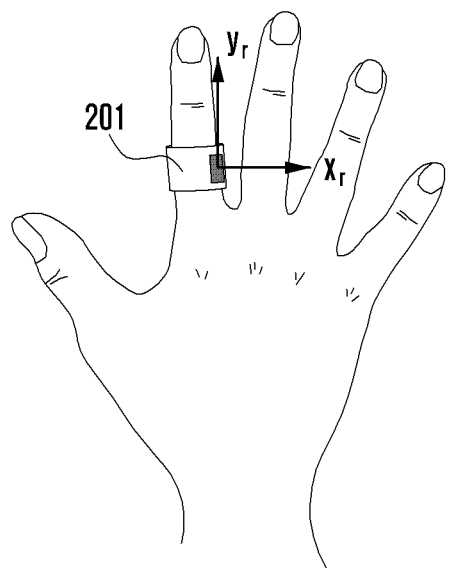

FIG. 4C is an illustration of an electronic device determining a final orientation of the electronic device by using information from touch sensors and inertial sensors, according to an embodiment of the present disclosure.

Referring to FIG. 4C, the processor 303 may use the information from the touch sensors 302 concerning the location of the adjacent finger (which is the finger adjacent to the index finger, where the index finger is wearing the electronic device 201 in FIG. 4C) to determine the absolute orientation of the index finger.

Figure 4D:
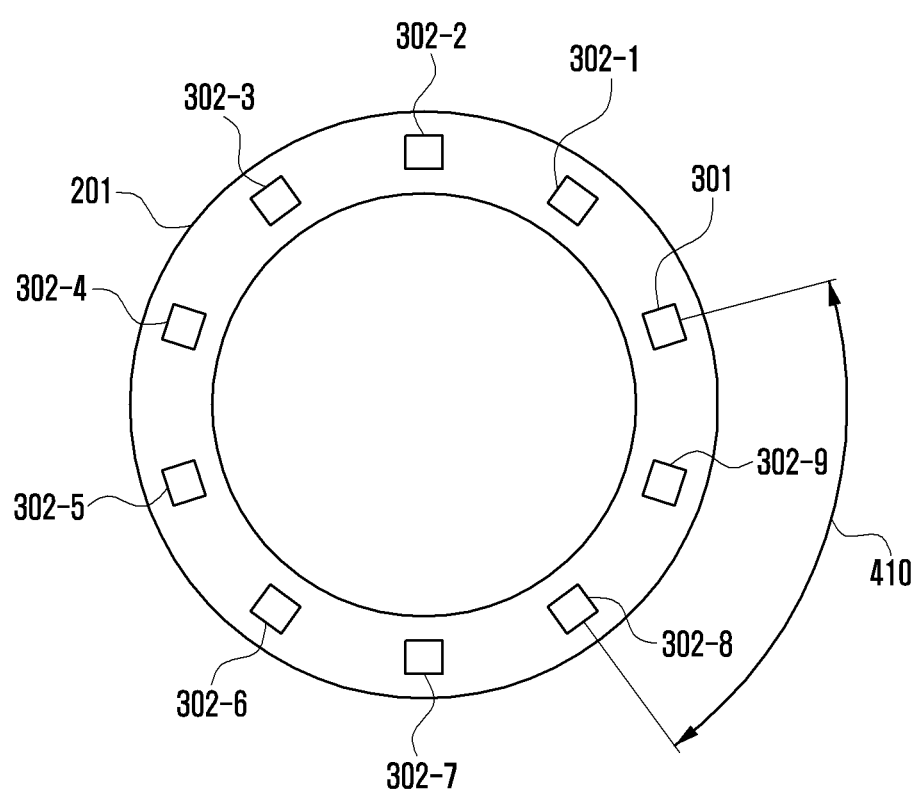
FIG. 4D is an illustration of an electronic device determining an absolute orientation of the electronic device by using information from touch sensors and inertial sensors, according to an embodiment of the present disclosure.

FIG. 4D is an illustration of an electronic device determining an absolute orientation of the electronic device by using information from touch sensors and inertial sensors, according to an embodiment of the present disclosure.

Referring to FIG. 4D, the electronic device may include a plurality of touch sensors 302-1, 302-2, 302-3, 302-4, 302-5, 302-6, 302-7, 302-8, and 302-9. The plurality of touch sensors 302-1, 302-2, 302-3, 302-4, 302-5, 302-6, 302-7, 302-8, and 302-9 may detect a touch input. The processor 303 may determine a location of a touch input by identifying at least one of the plurality of touch sensors 302-1, 302-2, 302-3, 302-4, 302-5, 302-6, 302-7, 302-8, and 302-9 and identifying a location of the identified touch sensor 302-1, 302-2, 302-3, 302-4, 302-5, 302-6, 302-7, 302-8, and 302-9.

The processor 303 may determine a relative orientation 410 between the identified touch sensor (e.g. touch sensor 302-8) and the inertial sensor 301. For example, the processor 303 may determine a relative orientation by using a location of the inertial sensor 301 and a location of the identified touch sensor 302-8. The processor 303 may determine a final orientation based on the relative orientation and the first orientation. For example, the processor 303 may correct the first orientation by using the relative orientation between the inertial sensor 301 and the identified touch sensor 302-8 and acquire the final orientation by correcting the first orientation.

Figure 5:
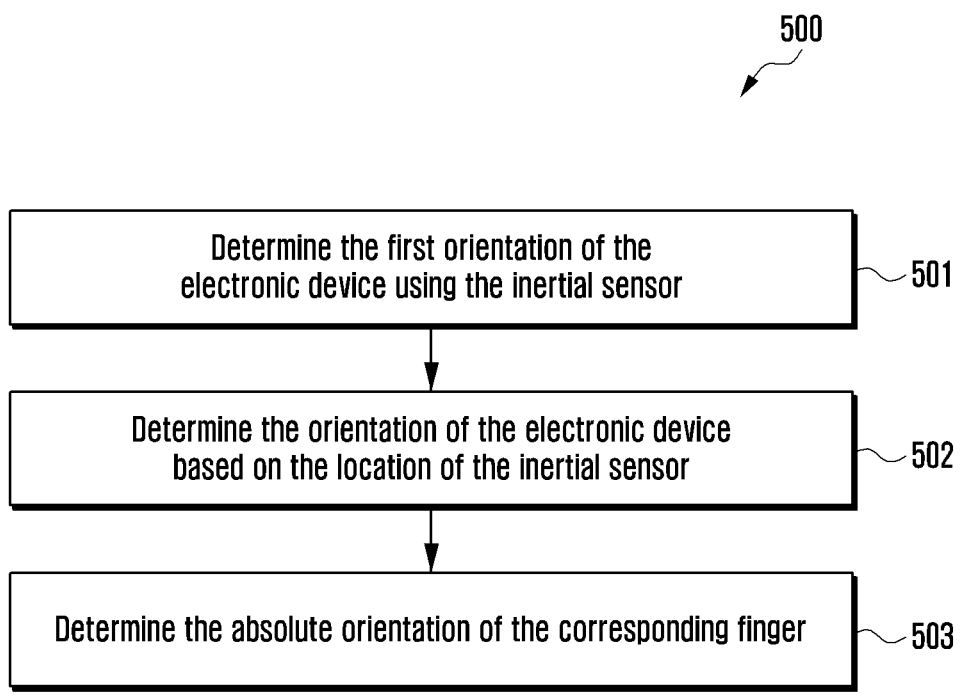
FIG. 5 is a flowchart of a method of determining a final orientation of an electronic device and a corresponding finger, according to an embodiment of the present disclosure.

FIG. 5 is a flowchart of a method 500 of determining an absolute orientation of an electronic device and a corresponding finger.

Referring to FIG. 5, at step 501, the electronic device (e.g., electronic device 201) determines a first orientation of the electronic device 201 using the inertial sensor 301.

At step 502, the electronic device 201 further determines an orientation of the electronic device 201 based on a location of the inertial sensor 301.

At step 503, the electronic device 201 further determines an absolute orientation of the corresponding finger using the first orientation and the orientation of the electronic device 201. The absolute orientation may be with respect to a fixed plane, such as a ground plane. The electronic device 201 may determine the absolute orientation using a sensor fusion approaches such as a Kalman filter, a Madwick filter, or any other equivalent method. The steps of the method 500 of FIG. 5 may be performed in the order presented, in a different order or simultaneously. Further, in an embodiment of the present disclosure, some of the steps listed in FIG. 5 may be omitted.

Figure 6:
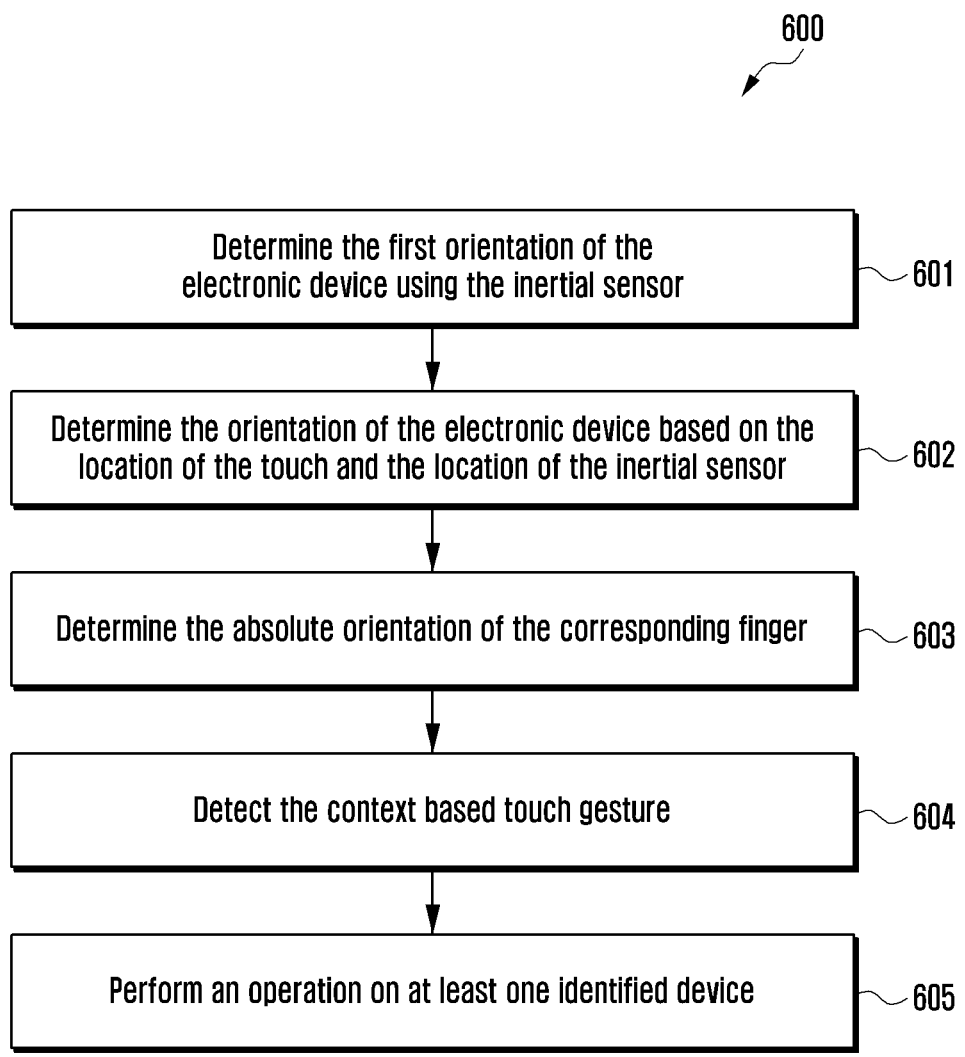
FIG. 6 is a flowchart of a method of determining an absolute orientation of an electronic device and a corresponding finger, where a user performs at least one touch gesture on the electronic device, according to an embodiment of the present disclosure.

FIG. 6 is a flowchart of a method 600 of determining an absolute orientation of an electronic device (e.g. electronic device 201) and a corresponding finger on a user performing at least one touch gesture on the electronic device 201, which may be in the form of a ring.

Figure 7A:
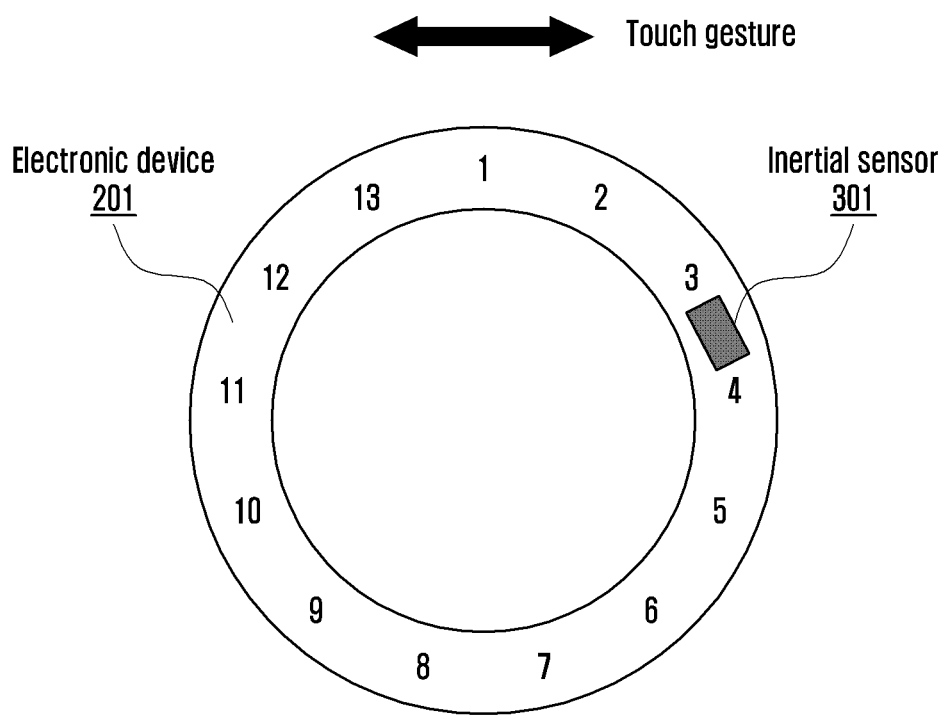
FIG. 7A is an illustration of an electronic device determining a first orientation of the electronic device, according to an embodiment of the present disclosure.

Referring to FIG. 6, at step 601, the electronic device 201 determines a first orientation of the electronic device 201 using an inertial sensor 301 (as depicted in FIG. 7A).

FIG. 7A is an illustration of an electronic device determining a first orientation of the electronic device, according to an embodiment of the present disclosure.

At step 602, after the user performs a touch gesture, the electronic device 201 determines an orientation of the electronic device 201 based on a location of the touch and a location of the inertial sensor 301.

At step 603, the electronic device 201 further determines an absolute orientation of the corresponding finger using the determined first orientation and the orientation of the electronic device 201. The absolute orientation may be with respect to a fixed plane, such as a ground plane.

At step 604, the electronic device 201 detects a context based touch gesture using the determined first orientation.

At step 605, based on the detected context based touch gesture, the electronic device 201 performs an operation on at least one identified device 202, wherein the operation corresponds to the detected context based touch gesture.

Figure 7B:
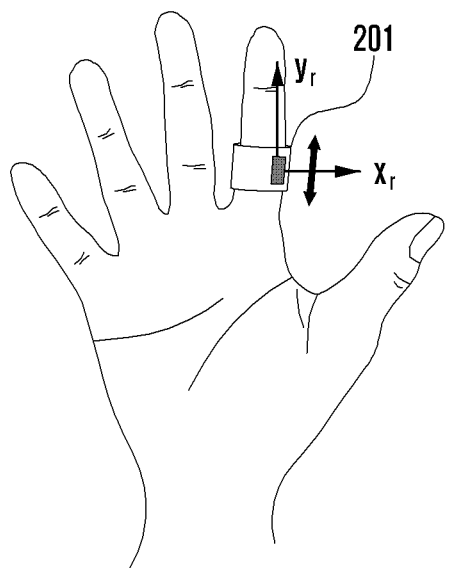
FIG. 7B is an illustration of an electronic device determining an orientation of the electronic device to determine an absolute finger/hand orientation, according to an embodiment of the present disclosure.
Figure 7B:
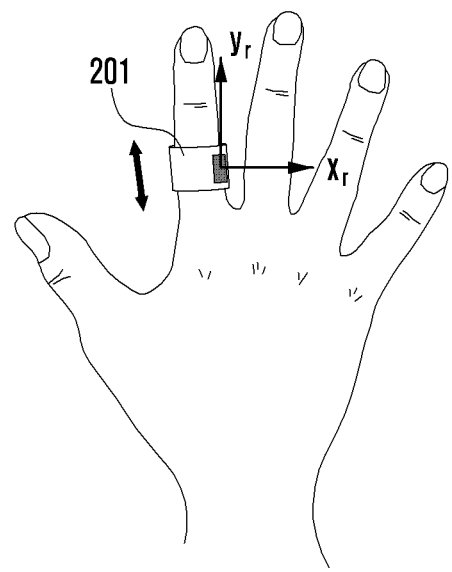

FIG. 7B is an illustration of an electronic device determining an orientation of the electronic device to determine an absolute finger/hand orientation, according to an embodiment of the present disclosure.

Referring to FIG. 7B, the inertial sensor 301 determines the same first orientation for both hand positions (e.g. hand position 1 and hand position 2). However, by combining the information from the touch sensor 302, the electronic device 201 may determine an absolute finger/hand orientation. The steps in method 600 in FIG. 6 may be performed in the order presented, in a different order or simultaneously. Further, in an embodiment of the present disclosure, some of the steps listed in FIG. 6 may be omitted.

Figure 8:
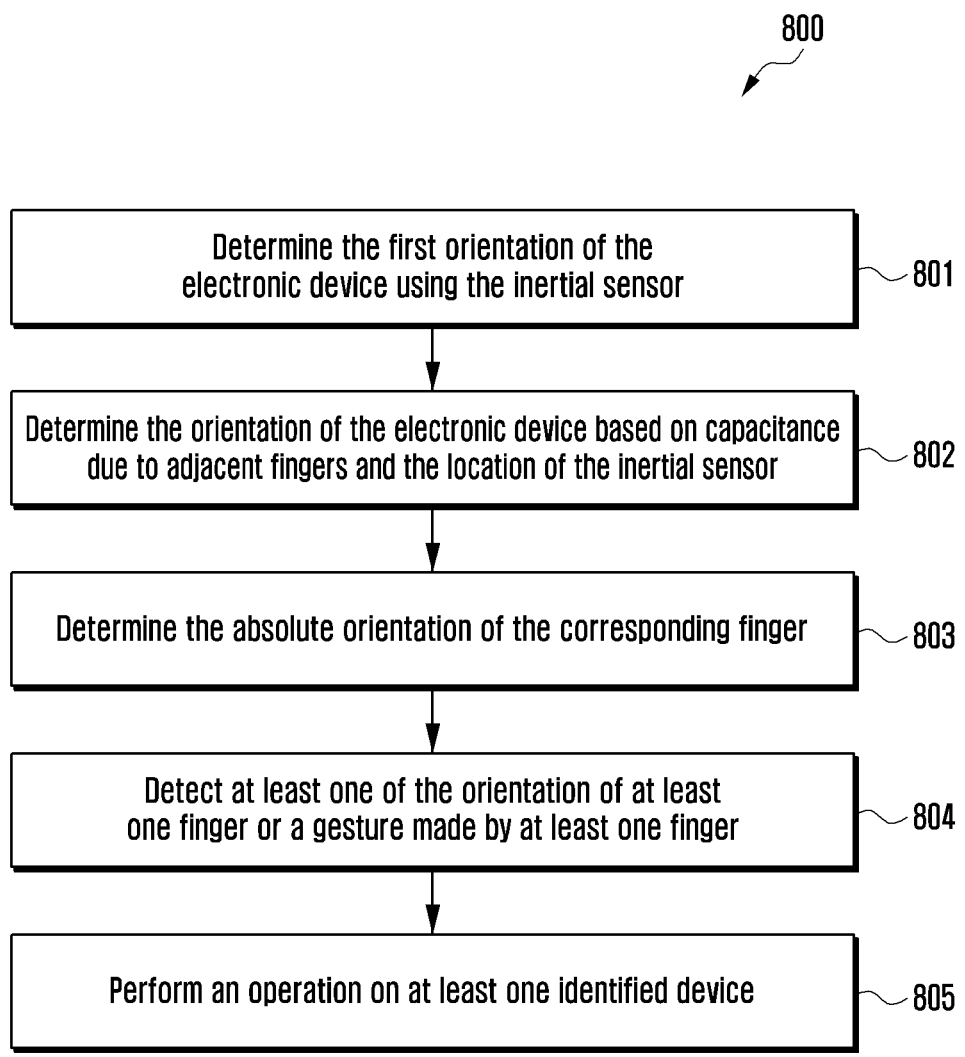
FIG. 8 is a flowchart of a method of determining an absolute orientation of an electronic device and a corresponding finger, for tracking an orientation of the finger or detecting a motion gesture, according to an embodiment of the present disclosure.

FIG. 8 is a flowchart of a method 800 of determining an absolute orientation of an electronic device (e.g. electronic device 201) and a corresponding finger for tracking the orientation of the finger or detecting a motion gesture.

Referring to FIG. 8, at step 801, the electronic device 201 determines a first orientation of the electronic device 201 using the inertial sensor 301.

At step 802, the electronic device 201 determines an orientation of the electronic device 201 based on a capacitance due to adjacent fingers and a location of the inertial sensor 301.

At step 803, the electronic device 201 determines an absolute orientation of the corresponding finger using the determined first orientation and the orientation of the electronic device 201. The absolute orientation may be with respect to a fixed plane, such as a ground plane.

At step 804, the electronic device 201 detects at least one of an orientation of at least one finger or a gesture made by at least one finger.

At step 805, based on the detected orientation of the finger(s) or the gesture made by the finger(s), the electronic device 201 performs an operation on at least one identified device 202, wherein the operation corresponds to the detected orientation of the finger(s) or the gesture made by the finger(s). The steps in method 800 of FIG. 8 may be performed in the order presented, in a different order or simultaneously. Further, in an embodiment of the present disclosure, some steps listed in FIG. 8 may be omitted.

Figure 9:
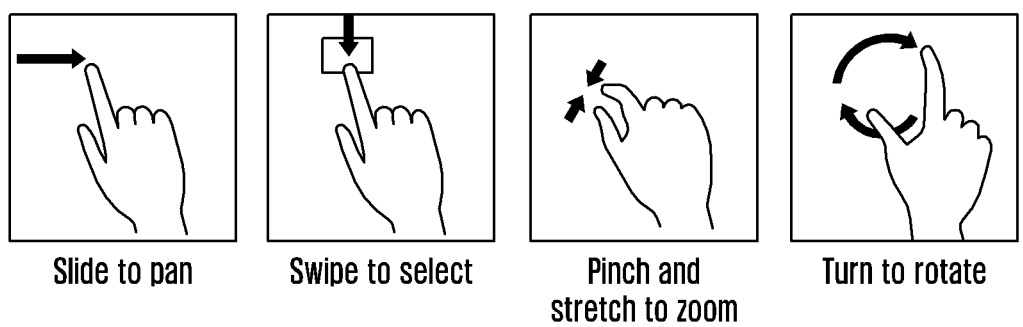
FIG. 9 is an illustration of a user controlling a device using a gesture performed by a finger of the user, where an electronic device is on the finger performing the gesture, according to an embodiment of the present disclosure.

FIG. 9 is an illustration of a user controlling a device using a gesture performed by a finger of the user, where the electronic device 201 is present on the finger performing the gesture. In an embodiment of the present disclosure, the user may wear electronic devices on multiple fingers.

Referring to FIG. 9, an action may be an action such as but not limited to a slide to pan, a swipe to select, a pinch and a stretch to zoom, a turn to rotate, and so on. The gestures may be at least one of a static gesture or a dynamic gesture. The controlling of the device 202 may include performing at least one operation on the device 202, such as navigating a user interface (UI) on the device 202.

Figure 10:
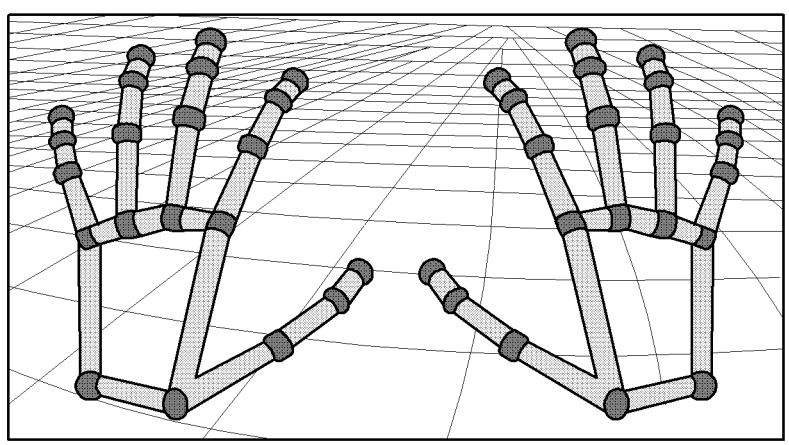
FIG. 10 is an illustration of a user using electronic device(s) in a virtual reality (VR) application, according to an embodiment of the present disclosure.

FIG. 10 is an illustration of a user using electronic device(s) in a VR application.

Referring to FIG. 10, the user may wear electronic devices on multiple fingers. The orientation of the individual fingers of the user may be tracked using the electronic device(s). The orientation may be mapped to a virtual hand model in a VR environment.

Figure 11:
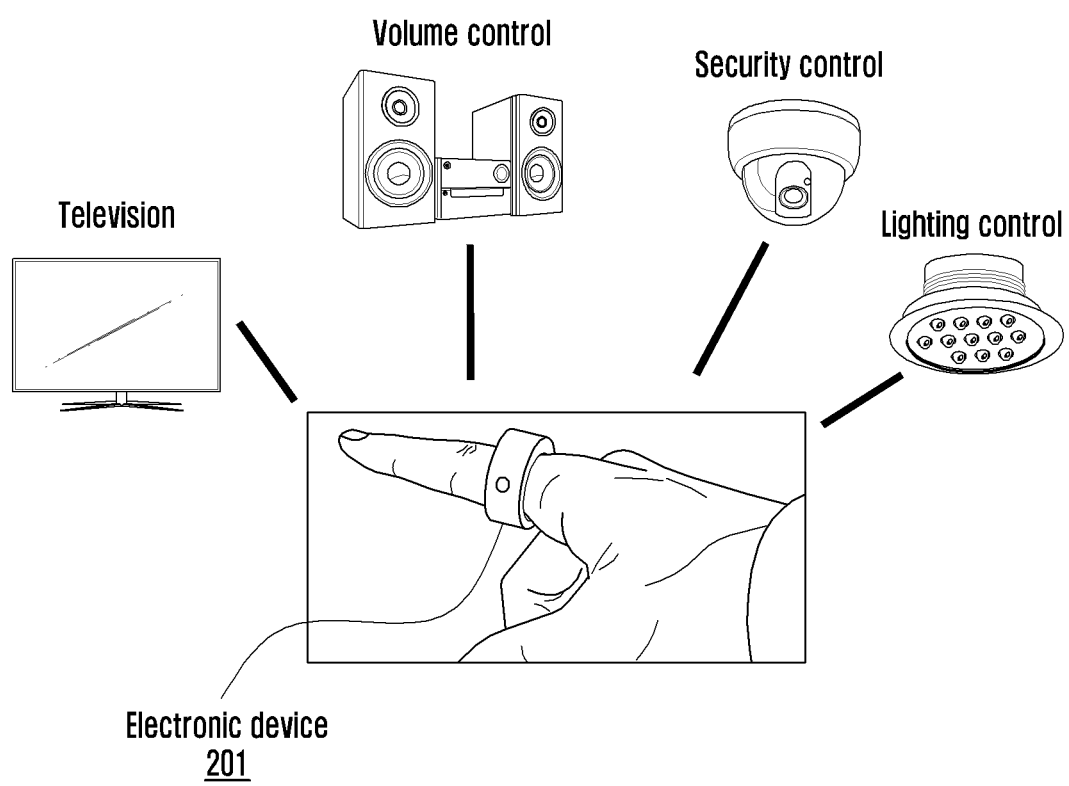
FIG. 11 is an illustration of a user using an electronic device as a processor to point and connect to a plurality of devices, according to an embodiment of the present disclosure.

FIG. 11 is an illustration of a user using an electronic device as a processor to point and connect to a plurality of devices. The device may be, but is not limited to, a television, a volume control for a device, a security control, and a lighting control.

Referring to FIG. 11, the electronic device 201 may use a direction in which a finger is pointing to identify a device to which to connect. Upon identifying the device, the electronic device 201 may enable the user to control the identified device using a touch gesture.

Figure 12:
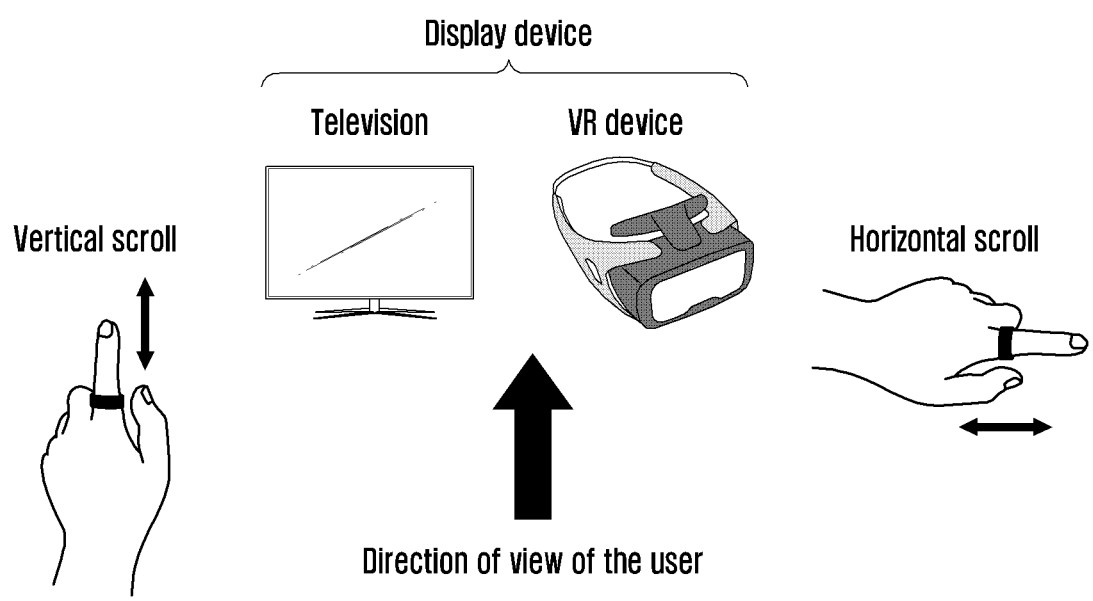
FIG. 12 is an illustration of a display device being controlled based on an identified intent, according to an embodiment of the present disclosure.

FIG. 12 is an illustration of a display device being controlled based on an identified intent.

Referring to FIG. 12, the electronic device 201 may identify the intent of the touch gesture based on an orientation of the display device (wherein the display device may be a device such as but not limited to a television, a VR device, and so on). The electronic device 201 may interpret a swipe gesture based on a relative orientation of the electronic device 201 and the display device.

Figure 13A:
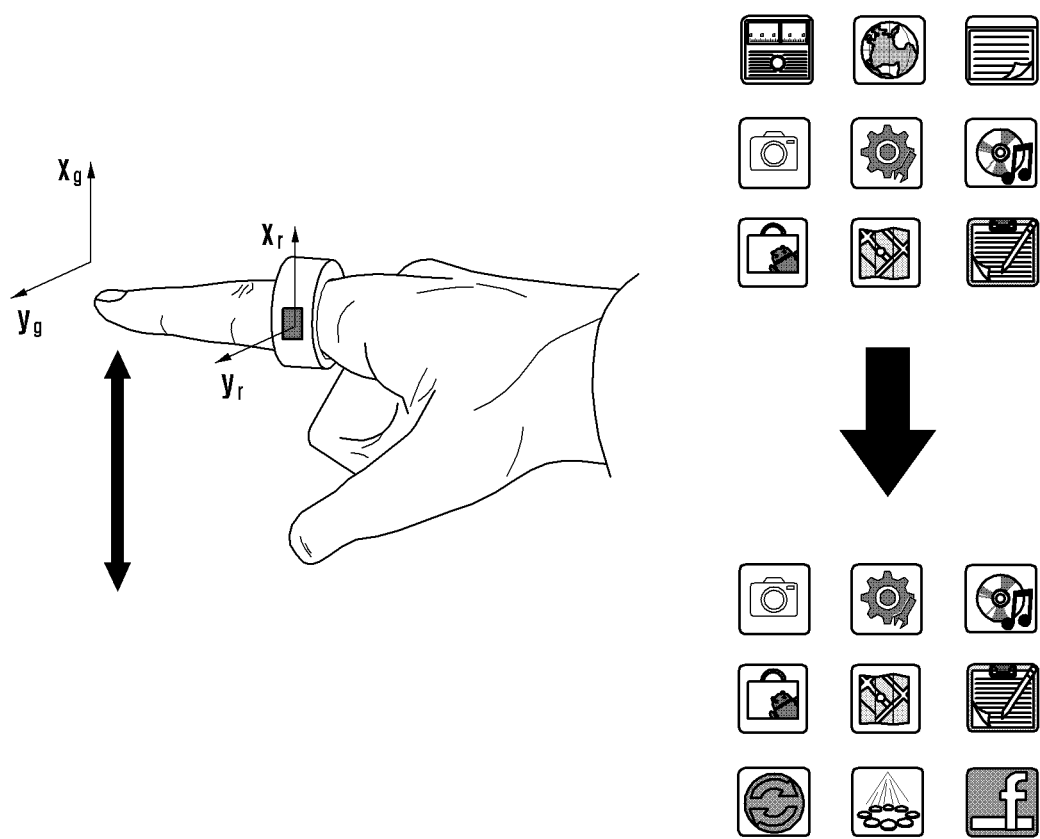
FIGS. 13A and 13B is an an illustration of a user performing vertical scrolling and horizontal scrolling on a device using an electronic device, according to an embodiment of the present disclosure.
Figure 13B:
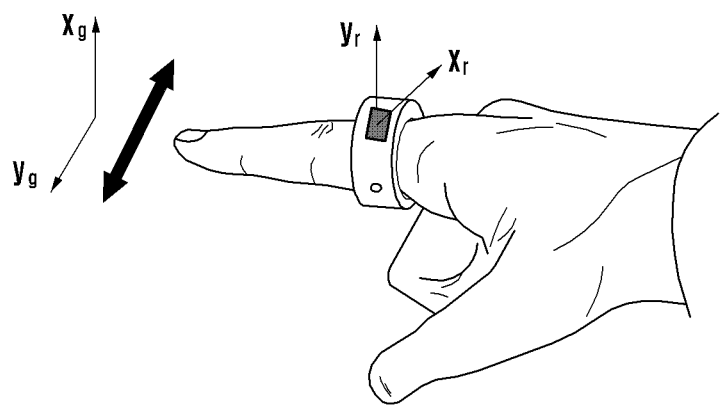
Figure 13B:
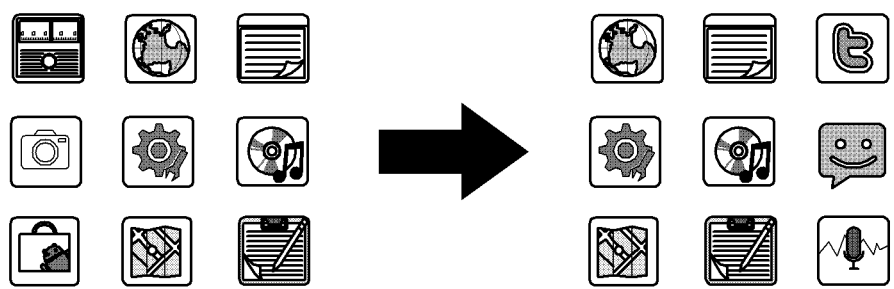

FIGS. 13A and 13B are illustrations of a user performing vertical scrolling and horizontal scrolling on a device using an electronic device.

Referring to FIG. 13A, the user intends to perform a vertical scrolling action and performs a motion along a vertical $x_g$ axis and the electronic device 201 determines the rotation of the electronic device 201 about a global $y_g$ axis. The UI then reflects a vertical scroll.

Referring to FIG. 13B, the user intends to perform a horizontal scrolling action and performs a motion along a vertical $y_g$ axis and the electronic device 201 determines the rotation of the electronic device 201 about a global $x_g$ axis. The UI then reflects a horizontal scroll.

The present disclosure may be implemented through at least one software program running on at least one hardware device and performing network management functions to control elements. For example, the elements shown in FIGS. 2A, 2B, and 3 may be at least one of a hardware device, or a combination of a hardware device and a software module.

The foregoing description may so fully reveal the general nature of the present disclosure that others may, by applying current knowledge, readily modify and/or adapt for various applications the embodiments of the present disclosure without departing from the scope of the present disclosure, and, therefore, such adaptations and modifications are intended to be within the scope of the present disclosure. It is to be understood that the terminology employed herein is for the purpose of description and not of limitation. Therefore, while the present disclosure is described in terms of certain embodiments, those skilled in the art will recognize that the present disclosure may be practiced with modification within the scope of the present disclosure, as defined by the appended claims and their equivalents.

What is claimed is:

1. A method for detecting a gesture performed by a user using an electronic device, the method comprising:
   determining a first orientation of the electronic device using at least one inertial sensor;
   determining a location of the touched area touched by an adjacent finger with respect to at least one finger on which the electronic device is worn using at least one touch sensor;
   determining a final orientation of the electronic device by correcting the first orientation based on a relative position between the determined location of the touch area and the at least one inertial sensor; and
   executing at least one function corresponding to at least one user gesture based on the determined final orientation of the electronic device.

2. The method of claim 1, wherein the orientation of the electronic device worn on the at least one finger of the user is determined using:
   a location of a point of touch on the electronic device, on the user performing at least one touch gesture on the electronic device; and
   a location of the at least one inertial sensor.

3. The method of claim 1, wherein the orientation of the electronic device on the at least one finger of the user is determined using:
   a capacitance due to at least one finger adjacent to the at least one finger; and
   a location of the at least one inertial sensor.

4. The method of claim 1, wherein the method further comprises:
   detecting at least one target device using the determined final orientation; and
   enabling the user to interact with a target device using the electronic device.

5. The method of claim 1, wherein the method further comprises using the interpreted at least one user gesture for navigating a user interface (UI) of a target device.

6. The method of claim 1, further comprising the user using a plurality of electronic devices.

7. The method of claim 6, further comprising:
   tracking the determined final orientation for the plurality of electronic devices;
   determining orientations of fingers of the user wearing the plurality of electronic devices; and
   enabling the user to interact with a virtual reality (VR) application by mapping the determined orientation to a virtual hand model in the VR application.

8. The method of claim 1, further comprising:
   determining a relative orientation between the at least one touch sensor and the at least one inertial sensor based on a second orientation; and
   determining the final orientation based on the relative orientation and the first orientation.

9. The method of claim 8, wherein the electronic device further comprises a plurality of touch sensors; and
   wherein the method further comprises:
   identifying at least one of the plurality of touch sensors corresponding to a touch input; and
   determining the relative orientation based on locations of the at least one of the plurality of touch sensors and a location of the at least one inertial sensor.

10. An electronic device, comprising
    at least one inertial sensor configured to determine a first orientation of the electronic device;
    at least one touch sensor configured to determine a location of the touched area touched by an adjacent finger with respect to at least one finger on which the electronic device is worn; and
    a processor configured to:
    determine a final orientation of the electronic device by correcting the first orientation based on a relative position between the determined location of the touch area and the at least one inertial sensor; and
    execute at least one function corresponding to at least one user gesture based on the determined final orientation of the electronic device.

11. The electronic device of claim 10, wherein the processor is configured to determine the orientation of the electronic device worn on the at least one finger of the user using
    a location of a point of touch on the electronic device, as the user performs at least one touch gesture on the electronic device; and
    a location of the at least one inertial sensor.

12. The electronic device of claim 10, wherein the processor is configured to determine the orientation of the electronic device worn on the at least one finger of the user using a capacitance due to at least one finger adjacent to the at least one finger; and a location of the at least one inertial sensor.

13. The electronic device of claim 10, wherein the processor is further configured to detect at least one target device using the determined final orientation; and enable the user to interact with a target device using the electronic device.

14. The electronic device of claim 10, wherein the processor is configured to use the interpreted at least one user gesture for navigating a user interface (UI) of a target device.

15. The electronic device of claim 10, wherein the processor is configured to:

track the determined final orientation of a plurality of electronic devices;

determine orientations of fingers of the user wearing the plurality of electronic devices; and enable the user to interact with a virtual reality (VR) application by mapping the determined orientation to a virtual hand model in the VR application.

16. The electronic device of claim 10, wherein the processor is further configured to:

determine a relative orientation between the at least one touch sensor and the at least one inertial sensor based on a second orientation; and determine the final orientation based on the relative orientation and the first orientation.

17. The electronic device of claim 16, wherein the electronic device further comprises a plurality of touch sensors; and wherein the processor is further configured to:

identify at least one of the plurality of touch sensors corresponding to a touch input, and determine the relative orientation based on a location of the at least one of the plurality of touch sensors and a location of the at least one inertial sensor.

* * * * *